United States Patent [19]

Strauss et al.

[11] Patent Number: 4,485,010

[45] Date of Patent: Nov. 27, 1984

[54] WET JIGGING MACHINE FOR DRESSING COAL OR OTHER MINERALS

[75] Inventors: Werner Strauss, Bochum; Siegfried Heintges, Haltern, both of Fed. Rep. of Germany

[73] Assignee: Klockner-Humboldt-Deutz AG, Fed. Rep. of Germany

[21] Appl. No.: 451,966

[22] Filed: Dec. 21, 1982

[30] Foreign Application Priority Data

Dec. 23, 1981 [DE] Fed. Rep. of Germany ....... 3150999

[51] Int. Cl.$^3$ ................................................ B03B 5/24
[52] U.S. Cl. .................................... 209/500; 209/502; 251/59
[58] Field of Search ................................ 251/305–307, 251/59, 308, 60; 209/425, 426, 455, 502, 468, 427, 456, 469, 475, 476, 500; 137/596.14, 596.16

[56] References Cited

U.S. PATENT DOCUMENTS

| 3,688,645 | 9/1972 | Reaves | 251/59 |
| 4,019,981 | 4/1977 | Stern | 209/455 |
| 4,164,236 | 8/1979 | Owen et al. | 251/306 |
| 4,301,833 | 11/1981 | Donald | 137/527 |
| 4,342,654 | 8/1982 | Lambert | 209/457 |

FOREIGN PATENT DOCUMENTS

| 146270 | 6/1936 | Austria | 209/468 |
| 796554 | 10/1935 | France | 209/468 |

Primary Examiner—David Lacey
Assistant Examiner—William Bond
Attorney, Agent, or Firm—Hill, Van Santen, Steadman & Simpson

[57] ABSTRACT

A wet jigging mechanism for handling coal or other minerals including a mineral containing tank, a pulsed air chamber opening downwardly into the tank, a compressed air source with a conduit and a vent conduit with valves in the conduit, the valves including pivotal butterfly valves on a shaft with a swing flap operator operated by the compressed air to move the butterfly valve and the swing wing engaging a variable positioned rubber stop damper at the open position of the butterfly valve, and a rubber seat for the butterfly valve in closed position acting as a damper.

12 Claims, 4 Drawing Figures

WET JIGGING MACHINE FOR DRESSING COAL OR OTHER MINERALS

BACKGROUND OF THE INVENTION

The present invention relates to improvements in mechanisms for the preparation of mineral mixtures, particularly of a rough washed coal in a jig controlled by compressed air wherein the liquid mixture of the coal is given a pulsed motion by means of pulsations of compressed air, and the invention particularly relates to an improved valve structure for controlling the air pulsations.

In wet jigging machines for preparing coal or other minerals, it is customary to employ a plurality of pulse chambers which may open downwardly beneath the surface of the liquid and the chambers are supplied with air pulsations at a controlled frequency. In a control of these pulsations, both for the supply of compressed air and the release of air to the atmosphere, the valves that have been used conventionally employ rotary slide valves or disk or mushroom poppet type valves. An example of a control arrangement is shown and described in U.S. Pat. No. 4,019,981.

An object of the present invention is to provide an improved valve construction and operation which avoids disadvantages present in valves heretofore available such as rotary slide valves and which allows for a better and individual control of the pulsed air. A further object is to provide a valve arrangement which avoids disadvantages present with disk or poppet type valves. An object is to provide a valve structure which is less complicated, obtains individual control of a pulsed air and requires no actuation compressed air system so that the conventional supply of compressed air may be used for operation. A mechanical structure should be as simple as possible, and the drive or operation mechanism for the valve should operate essentially free of wear and not require maintenance or repair.

In accordance with the principles of the invention, the control of the pulsed air utilizes a pivoted butterfly valve mounted on a central pivotal shaft wherein the valve functions quickly and moves with a low operating force and attains characteristics which are as good as or better than known poppet or slide valves. A further feature of the invention is the provision of the shaft with a butterfly valve with an extension which carries a swing flap or wing that is pneumatically or hydraulically moved to operate the valve. By providing a swing flap on the shaft which has a variable range of swing movement, a very compact valve unit is obtained with the operating power derived directly from the valve support shaft with the most direct response. With this structure, the drive by variable movement swing flap, the drive is superior to and simpler than a drive such as which employs a piston and a piston rod. Friction losses in the transmission of power are elimiated. The work can be carried out with the lowest amount of energy required, and the amount of mass to move with each movement of the valve is maintained very low.

A further feature of the invention is that the butterfly valve employs a multi-part seat formed of an elastomeric material, preferably rubber. With the elastomeric seat, minimum wear occurs between the valve and seat and a further advantage is attained in automatic damping of the valve closing. Further, the arrangement attains an advantage in that a part of the kinetic energy of the movement of the butterfly valve is stored in the elastomeric seat so that the reverse movement of the valve is augmented.

A further feature of the invention is the provision of a seat which is located in a conduit for the valve which has a larger outside diameter than the butterfly valve. Thus, the possible friction of the butterfly valve against the outside wall of the conduit is eliminated so that no breakaway force need be exerted when opening the butterly valve.

In a preferred arrangement, the butterfly valve is constructed with interconnected multiple plates which are preferably welded to each other. In this fabricated construction, the strength of the butterfly valve can be augmented, but its weight can be significantly reduced in comparison with a valve that has a onepiece solid structure and with equal actuating forces, more rapid movement of the butterfly valve is possible.

A further feature of the invention resides in providing a butterfly valve which is eccentrically connected to the shaft so that unequal areas face upstream toward the compressed air. The portion of the valve which moves against the seat facing upstream is of a larger area so that the balance of air forces tends to close the valve against its seat which improves the operation of the valve.

A further improvement resides in the operator for the valve which includes a variable movement swing flap which is located in contact-free relationship within a housing or chamber. The housing or chamber receives compressed air, controlled by an operating valve and supplied by the same source of compressed air which pulses the liquid. With this arrangement, no wear occurs in the operator, and the speed and forces required of the operator are not changed due to wear of the sealing elements. In accordance with the construction, a clearance or gap of 0.05 to 0.1 mm between the swing flap and the housing has been found to leave an air loss which is not significant in the operation of the valve using the standard source of compressed air as the working air which has a pressure of approximately 1.5 bar, and the loss of approximately 1 liter per second can be readily tolerated in the system.

The variable movement swing flap is constructed of mutually connected welded sheet metal plates which engage an elastic stop preferably in the form of an adjustable rubber cone in the open position of the valve. This rubber stop dampens the movement of the valve in the opening direction and also provides for the storage of kinetic energy of valve movement so that the characteristic of the valve in its closing movement against its elastomeric seat is obtained in the movement of the valve in opening direction by the elastomeric stop for the swing flap. The movement of the swing flap is gently decelerated and damped as the open position is reached, and a part of the kinetic energy is stored. Thus, overall a butterfly valve drive unit which functions quietly and which is rugged and functions reliably with a low energy requirement is attained.

It is a further feature of the invention that the butterfly valve, a pivot shaft and the variable swing flap form a mutually connected unit which can be commonly removed. Thus, an advantageous unitary design of the valve and drive is possible which enables very rapid replacement upon the occurrence of a malfunction. Replacement valve blocks can be kept on hand as standard components and can advantageously be repaired and maintained in the shops. This enhances the continued operation and reliability of the jigging machine.

A further advantage of the invention is that the operator in the form of the variable swing flap is actuated by the same source of air which is used for the pulsations. This provides that a separate compressed air system is not necessary and separate mechanical drives are not necessary.

As a result of the unitary structure and the use of pulsed air as the drive for the valve operator, it is possible to completely house the valves together with their drives in the compressed air chamber located upstream of the valves. This further attains a jigging machine which is compact and which can be constructed more compactly than valve arrangements heretofore available.

Other objects, advantages and features, as well as equivalent structures and methods, which are intended to be covered hereby, will become more apparent with the teaching of the principles of the invention in connection with the disclosure of the preferred embodiments in the specification, claims and drawings, in which:

DESCRIPTION OF THE PREFERRED EMBODIMENT

Figure 1:
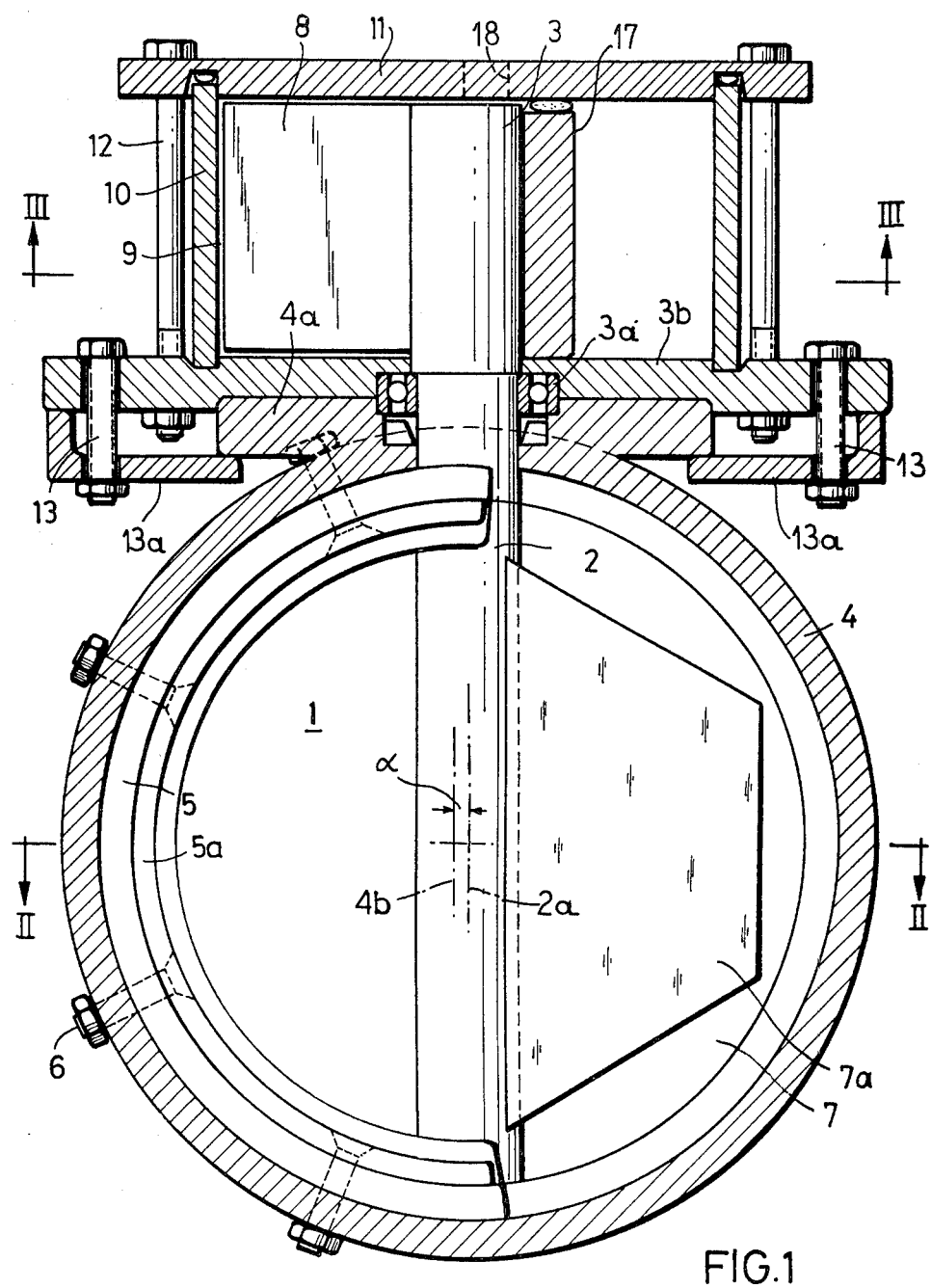
FIG. 1 is a horizontal sectional view taken laterally of the axis of the air conduit through the valve mechanism for controlling the air for a pulsing jigging mechanism, the sectional view taken substantially along lines I—I of FIG. 2 and FIG. 3.
Figure 2:
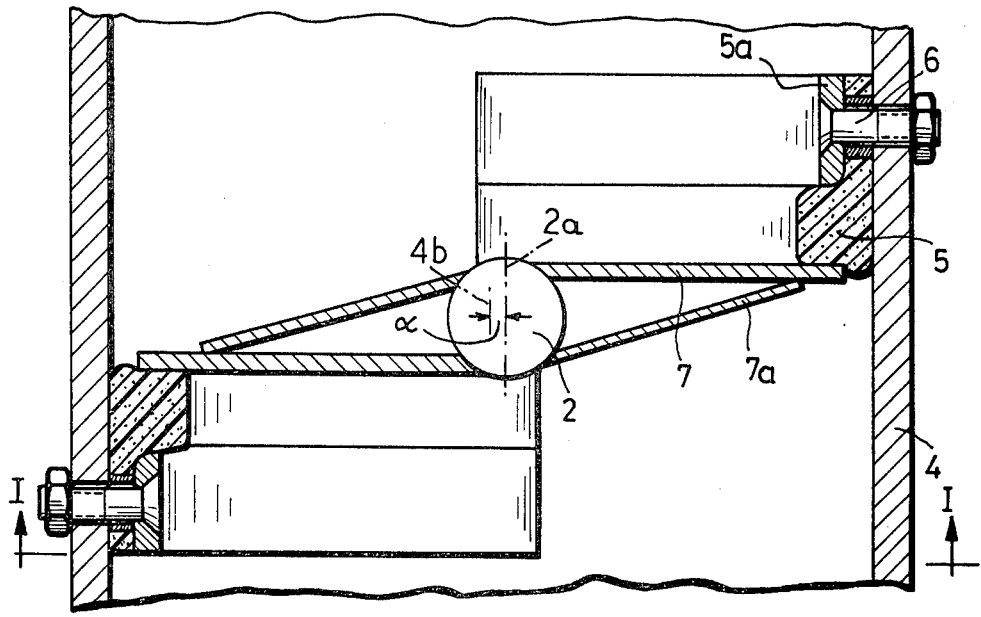
FIG. 2 is a fragmentary sectional view taken substantially along line II—II of FIG. 1.
Figure 3:
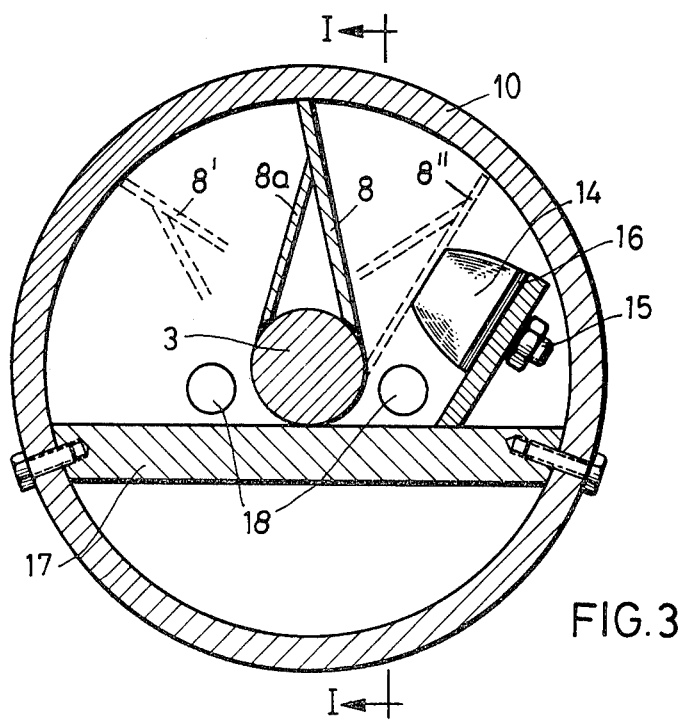
FIG. 3 is a vertical sectional view taken substantially along line III—III of FIG. 1.
Figure 4:
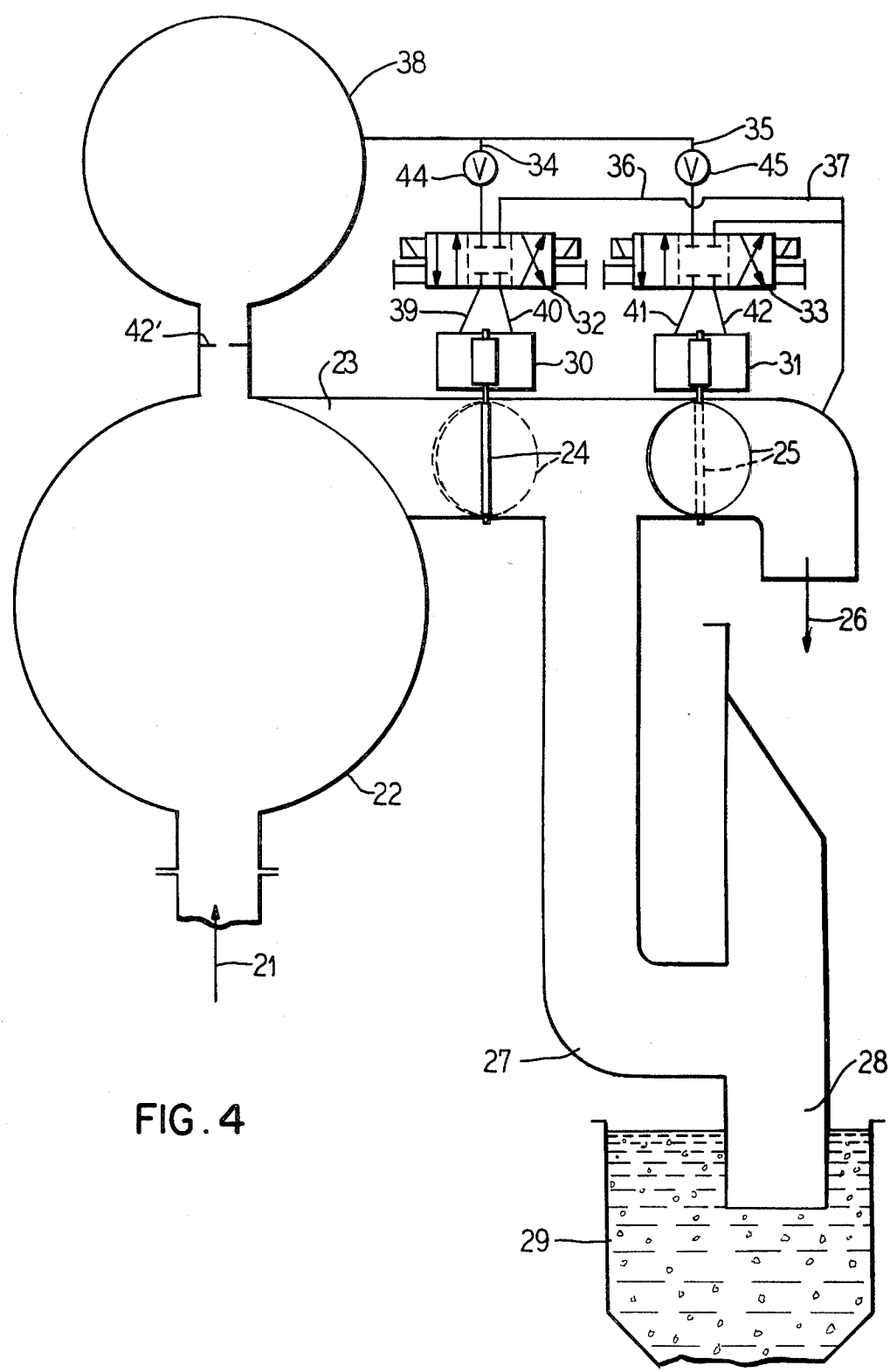
FIG. 4 is a somewhat schematic view illustrating the air supply control system for a jigging mechanism employing a valve arrangement constructed and operating in accordance with the principles of the present invention.

FIG. 4 illustrates schematically the overall system for supplying compressed air and releasing the compressed air in a pulsating motion to a chamber in a wet jigging mechanism. Details of the control valves shown at 24 and 25 are illustrated in FIGS. 1 through 3. The valve mechanism shown in FIGS. 1 through 3 may be employed as either or both of the valves 24 and 25, with 24 controlling the pulsating supply of compressed air, and valve 25 controlling the pulsating release of air to atmosphere.

The valves 24 and 25 are in the form of butterfly valves which are open and closed by valve operators 30 and 31. The valve operators are operated by the same compressed air as used for the pulsating jigging air, and the operators function under the control of valves 32 and 33 which are timed valves controlled by timing mechanism that determines the rate and time period for the supply and release of air to a downwardly facing jig chamber 28 which has a downwardly facing opening beneath the surface of liquid in a tank 29 which contains a mixture of coal and water. Control of the valves 32 and 33, for operating the air flow control valves, may be obtained by suitable mechanism such as that shown for example in the aforementioned U.S. Pat. No. 4,019,981.

In FIGS. 1 through 3 a pulsed air conduit 4 is shown with a valve shaft 2 extending laterally across the conduit.

A pivotal butterfly valve 7 is mounted on the shaft 2. The butterfly valve seats in closed position against a circumferential seal 5 which is of elastomeric material, preferably a silicon rubber. The valve seat 5 is in two parts to be engaged by each side of the butterfly valve as it moves toward closed position, and is supported by a hemispherical retaining ring 5a which is secured to the conduit by radially extending bolts 6. The butterfly valve flap 7 is suitably secured to the shaft, preferably by welding and is reinforced by a supporting plate 7a which is of smaller size so as to reinforce the valve plate 7, but to be of less area to move the center of gravity closer to the shaft 2 and reduce the inertia which would be present if a one-piece heavier valve plate 7 were used.

The shaft 2 has an integral extension 3 for drivably pivoting the shaft, and the extension 3 extends through an opening in the side of the conduit and is supported on an annual ball bearing 3a carried in a plate 3b. The plate 3b forms part of an annular housing 10 having an opposing closing plate 11. Mounted radially on the shaft extension 3 is a swing flap or wing 8 which is operated by compressed air to operate the valve and move the butterfly valve 7 intermittently back and forth between closed and open position. The swing flap 8 is mounted in the annular housing 10 so as to be contact-free at its outer edges so as to avoid operating friction. The small gap 9 is dimensioned sufficiently small so that air loss across the flap when compressed air is fed to one side is negligible. The end plates 3b and 11 are constructed so that they are clamped together by axially extending connecting bolts 12.

The annular housing 10 is mounted on the conduit 4 by being supported on a plate 4a welded on the conduit. The housing is clamped to the plate 4a by angle pieces 13a which are supported on the plate 3b by bolts 13. The bolts when tightened cause the angle pieces 13a to clamp the housing rigidly in place, but the bolts may be loosened to pivotally or rotatably adjust the housing for the purposes of adjusting the location of an elastomeric resilient stop 14, FIG. 3. In the construction shown, the housing assembly for the swing flap 8 can be removed by releasing the bolts 13 and thereby loosening the angled clamps 13a.

As illustrated in FIGS. 1 and 2, the butterfly valve is constructed so that the shaft 2 is offset relative to the axial center of the conduit 4 by a distance $a$. This construction results in the area of the flap valve 7 which face upstream, that is, toward the source of higher pressure compressed air which is larger on the side of the shaft tending to hold the valve closed than the area tending to open the valve. The conduit axis is shown at 4b and the shaft axis shown at 2a. In FIG. 2, the source of higher pressure is above the valve, and the pressure of the supply air will tend to hold the valve closed inasmuch as the area to the left of the shaft axis 2a is greater than the area to the right of the shaft axis. Thus, a permanent force of the butterfly valve against the seals occurs.

The valve is constructed so that its diameter is less than the inner diameter of the conduit and no interference or rubbing friction will occur between the edge of the butterfly valve ad the internal surface of the conduit. Thus, for opening the valve, only the difference in air pressure force against the valve need be overcome, which is the difference in butterfly area to the left of the axis 2a in excess of the area of the right of the axis 2a. The spacing between the edge of the butterfly valve and the inner surface of the conduit should be in the range of 3 through 7 mm, and a spacing of 5 mm has been proven to be particularly advantageous.

As to the valve operator, as shown in FIG. 3, the swing flap 8 is constructed with a reinforcing support plate 8a which is welded thereto and welded to the shaft extension 3. The swing flap 8 which acts as an operating crank for the shaft, moves from the lefthand position 8' where the valve is seated to the righthand position 8" where the flap engages the rubber stop 14.

The rubber stop is in the form of a cone and is of an elastomeric material, preferably silicone rubber. Washers 16 may be placed under the cone 14 which is held in place by a nut on a bolt 15. Cross plate 17 extends through the annular chamber 10 to isolate the working portion which is supplied with air pressure alternately through lines 18 to move the swing flap 8 back and forth between its position 8' and 8".

An important feature is the capability of adjustment of the movement of the swing flap 8 to its position 8' which determines the open position of the butterfly valve 7. This position is controlled by loosening the bolts 13, FIG. 1, and rotating the annular chamber 10 which in turn rotates the rubber stop 14 fixedly mounted within the chamber 10. Rotation of the chamber, of course, does not change the position of the swing flap 8 which is mounted on the shaft extension 3. For example, in FIG. 3, rotation of the chamber 10 in a counter-clockwise direction will move the rubber stop 14 further to the left to reduce the amount of swing of the swing flap 8. Rotational adjustment of the chamber 10 in a clockwise direction will move the rubber stop 14 to the right increasing the movement of the swing flap 8 to the right thereby permitting the butterfly valve 7 to be opened wider in its open position.

A feature of the invention is that the valve assembly including the shaft 2, the butterfly plate 7, and the swing flap 8 are compact and have a low mass and are constructed to have a low moment of inertia with the weight being close to the center of the shaft 2. Thus, the operating characteristic for opening and closing of the butterfly valve achieves the rapidity and ease heretofore accomplished by a poppet type valve. Actuation by a separate compressed air system is no longer required since the valve is operated by a substream of the same source of air used for the pulsations.

The features of the valve are particularly advantageous for use in a bottom pulsed jigging machine wherein the pulsation chamber faces downwardly, but features of the invention may also be employed for side pulsed jigging machines or like constructions.

As illustrated in FIG. 4, a source of compressed air for the pulsing operation is achieved from a compressor or blower shown schematically by the arrowed line 21. The compressed air is delivered to a reserve tank 22. A laterally connected tank 38 receives its supply of valve operating air from the main tank 22 and a restricting diaphragm 42' is provided in the passage leading to the valve operating tank 38.

Connecting lines 34 and 35 lead to control valves 32 and 33. These control valves are mechanically or electrically operated to provide the frequency of pulsations required, and have relief lines 36 and 37 leading to exhaust as illustrated schematically at 26.

The control valves have pressure and exhaust lines 39 and 40 for the valve 32 and 41 and 42 for the valve 33. These lines are connected to the annular chambers for the operating mechanism 30 and 31 for the butterfly valves 24 and 25. Each of the operating mechanisms 30 and 31 are constructed with the annular chambers 10 shown in FIGS. 1 and 3. Preferably, each of the valves 24 and 25 will have the construction shown in the detailed drawings of FIGS. 1 through 3, although for some purposes, it may be desirable to employ the valve arrangement shown in FIGS. 1 through 3 for only one of the valves 24 and 25 and another form of valve used for the other valve.

The valves 24 and 25 are operated alternately in timed sequence, and when the valve 24 is opened, pressurized pulsating air will be delivered down through the conduit 27 to the pulsing chamber 28 which opens downwardly in the tank 29 containing the coal in water suspension. When the valve 25 opens, the pulsing chamber 28 will be vented to atmosphere as shown at 26.

Thus, in operation each of the valves 24 and 25 are operated in timed sequence, and the passages shown at 18 are alternately connected to pressurized air and vented so as to cause the swing flap 8 to move back and forth and thereby pivot the shaft 2, 3, to move the butterfly valve between open and closed position. As the butterfly valve hits closed position, its movement is damped by engagement against the resilient seat 5, and the storage of kinetic energy results by the compression of the rubber of the seat 5. As the butterfly valve is moved to open position, the swing flap 8 strikes the stop 14 thereby damping the opening movement and the kinetic energy is stored by the compression of the stop 14.

While the conduits 4 are shown in one piece, it may be split at the location of the shaft so as to be able to separate the conduit and remove the shaft with its assembled parts as one piece for the replacement of a new shaft and a valve and swing flap in a simple operation. Other constructions for this assembly may be employed such as by mounting the butterfly valve on a splined hub so that the shaft 2, 3, may be pulled axially from the conduit and the butterfly valve removed through the conduit 4.

The pressure of the air required to operate the butterfly valves is less than that required for pulsating air and therefore, the pressure reducing diaphragm 42 is provided to reduce the pressure provided in the tank 38. The speed of operation of the butterfly valves 24 and 25 may be desired to be controlled in some instances. In one manner, this may be controlled by decreasing or increasing the pressure of the air supplied to the swing flaps, and a higher pressure air will increase their speed of movement and lower pressure will decrease their speed. This may be accomplished individually by pressure control valves 44 and 45 located in the lines 34 and 35 to the control valves 32 and 33. Other means of increasing or decreasing the speed of movement of the butterfly valves may be employed, and the speed at which the butterfly valves are broken from their closed position to begin moving toward their open position can be controlled by the amount of axial offset $a$ of the shaft 2 which, of course, controls the amount of area of the butterfly valve at each side of the pivotal axis of the shaft which in turn controls the force on balance holding the valve shut.

For operation without control of the speed of valve operation, the valves 44 and 45 may be omitted. A working air pressure in the tank of a satisfactory range would be from 4.5 to 2.5 meters of water and a working pressure range in the valve control tank 38 would be from 4.5 to 3.8 meters of water, with the valve control tank 38 operating at a slightly lower pressure than the main tank 22.

Thus, it will be seen that we have provided an improved valve system for jigs which meets the objectives and advantages above set forth, and not only achieves a compact more easily operating and reliable valve system, but improves the flow of pulsating air to improve the pulsation movement in the coal bed subjected to the pulsating air.

We claim as our invention:

1. A wet jig mechanism for handling coal or other minerals wherein a pulsed motion of a liquid mixture is generated by a pulsed compressed air comprising in combination:
    a pulsing valve for controlling the pulsed flow of air for a pulsing chamber including, an air conduit;
    a valve flap in said conduit supported on a pivotal shaft; and
    a valve support and operator means for supporting and pivoting said shaft to open and close said valve, said support means being adjustably pivotal to determine the extent of opening movement of said valve.

2. A wet jig mechanism for handling coal or other minerals constructed in accordance with claim 1:
    wherein said valve flap is in the form of a butterfly valve having an area extending on both sides of the pivotal shaft and a fluid operated swing wing is connected to said shaft for operating the valve.

3. A wet jig mechanism for handling coal or other minerals constructed in accordance with claim 1:
    and including a seat in said conduit for said valve flap formed of an elastomeric material so that the flap closes against the elastomeric seat compressing the material for a dampening movement of the valve and a storage of movement energy as the material is compressed.

4. A wet jig mechanism for handling coal or other minerals constructed in accordance with claim 3:
    wherein the seat has a larger outside diameter than the valve flap.

5. A wet jig mechanism for handling coal or other minerals constructed in accordance with claim 1:
    wherein the valve flap has a supporting metal plate connected to the pivotal shaft and secured to the valve flap.

6. A wet jig mechanism for handling coal or other minerals constructed in accordance with claim 1:
    wherein said valve flap is in the form of a butterfly valve having areas on each side of the pivotal shaft with the area which moves upstream in the open position of the valve being greater than the area at the other side of the shaft so that the upstream air exerts a closing force against the valve.

7. A wet jig mechanism for handling coal or other minerals constructed in accordance with claim 1:
    including an operator for said valve having a swing wing movable in a wing chamber supplied with compressed fluid for operating the wing and wherein the wing moves contact-free in the chamber without frictional engagement with the walls of the chamber.

8. A wet jig mechanism for handling coal or other minerals constructed in acordance with claim 7:
    wherein the swing wing is formed of multiple inter-welded metal plates supported on the shaft.

9. A wet jig mechanism for handling coal or other minerals constructed in accordance with claim 1:
    including a swing wing connected to the shaft for operating the valve and an elastomeric stop engageable by the swing wing in the open position of the valve.

10. A wet jig mechanism for handling coal or other minerals constructed in accordance with claim 1:
    including an operating swing wing connected to the shaft for operating the valve wherein the valve, shaft, and wing are interconnected so as to be removable as a unit.

11. A wet jig mechanism for handling coal or other minerals constructed in accordance with claim 1:
    including a swing wing connected to the shaft for operating the valve with an air pressure connection for operating the wing supplied by the compressed air for the valve.

12. A wet jigging mechanism for handling coal or other minerals wherein a pulsed motion of a liquid mixture is generated by pulsed air comprising in combination:
    an air conduit for connection to an air line leading to a chamber beneath the surface of a liquid vessel for a mineral mixture;
    a pivoted butterfly valve in said conduit mounted on a pivotal shaft extending laterally across said conduit with the valve having different areas on opposite sides of said shaft to reduce the pivotal force necessary to pivot the valve; and
    a valve operator connected to said shaft and driving said shaft in pivotal movement in a closing stroke wherein the valve is closed across said conduit and an opening stroke wherein said valve is open to allow the flow of air through the conduit;
    and said valve operator including a wing means and an elastomeric stop engageable by the wing means at an open position of the valve so that the opening movement of the valve is damped and energy is stored.

* * * * *